United States Patent
Keller et al.

(10) Patent No.: US 10,585,479 B2
(45) Date of Patent: Mar. 10, 2020

(54) CONTROL FOR A VIRTUAL REALITY SYSTEM INCLUDING OPPOSING PORTIONS FOR INTERACTING WITH VIRTUAL OBJECTS AND PROVIDING TACTILE FEEDBACK TO A USER

(71) Applicant: Facebook Technologies, LLC, Menlo Park, CA (US)

(72) Inventors: Sean Jason Keller, Kirkland, WA (US); Tristan Thomas Trutna, Seattle, WA (US); Garett Andrew Ochs, Seattle, WA (US); Selso Luanava, Woodinville, WA (US); Nicholas Roy Corson, Mukilteo, WA (US); Laura Cristina Trutoiu, Seattle, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 290 days.

(21) Appl. No.: 15/347,128

(22) Filed: Nov. 9, 2016

(65) Prior Publication Data
US 2017/0131774 A1    May 11, 2017

Related U.S. Application Data

(60) Provisional application No. 62/253,604, filed on Nov. 10, 2015.

(51) Int. Cl.
*G06F 3/01*     (2006.01)
*G02B 27/00*    (2006.01)
(Continued)

(52) U.S. Cl.
CPC ............ *G06F 3/016* (2013.01); *A63F 13/212* (2014.09); *A63F 13/213* (2014.09); *A63F 13/25* (2014.09); *A63F 13/26* (2014.09); *A63F 13/285* (2014.09); *G02B 27/005* (2013.01); *G06F 3/011* (2013.01); *G06F 3/014* (2013.01); *A63F 2300/8082* (2013.01)

(58) Field of Classification Search
CPC .................... G06F 3/011–015; G06F 3/016
USPC .................................... 345/156–172
See application file for complete search history.

(56) References Cited

U.S. PATENT DOCUMENTS 5,631,861 A *    5/1997  Kramer ............... G06F 3/011
                                                     414/5
9,104,271 B1 *   8/2015  Adams .................. G06F 3/0426
(Continued)

*Primary Examiner* — Michael Pervan
(74) *Attorney, Agent, or Firm* — Fenwick & West LLP

(57) ABSTRACT

A control for a virtual reality (VR) system environment includes a portion and an additional portion each configured to contact different portions of a user's body. As one of the portions of the user's body moves towards the other potion of the user's body, the corresponding portion of the material contacting the moving portion of the user's body also moves towards the other portion of the material contacting the other portion of the user's body. Different positions of the portion and the additional portion relative to each other may correspond to different instructions that cause the VR system environment to perform different actions. In some embodiments, the control includes one or more feedback mechanisms providing the user with tactile feedback that simulates interactions with one or more virtual objects presented by the VR system environment.

21 Claims, 2 Drawing Sheets

(51) Int. Cl.
*A63F 13/285* (2014.01)
*A63F 13/25* (2014.01)
*A63F 13/213* (2014.01)
*A63F 13/212* (2014.01)
*A63F 13/26* (2014.01)

(56) References Cited

U.S. PATENT DOCUMENTS

| | | | |
|---|---|---|---|
| 2008/0094351 A1* | 4/2008 | Nogami | G06F 3/016 |
| | | | 345/156 |
| 2010/0009308 A1* | 1/2010 | Wen | A61C 7/08 |
| | | | 433/24 |
| 2012/0117514 A1* | 5/2012 | Kim | G06F 3/011 |
| | | | 715/849 |
| 2016/0363997 A1* | 12/2016 | Black | G06F 3/014 |

* cited by examiner

CONTROL FOR A VIRTUAL REALITY SYSTEM INCLUDING OPPOSING PORTIONS FOR INTERACTING WITH VIRTUAL OBJECTS AND PROVIDING TACTILE FEEDBACK TO A USER

CROSS-REFERENCE TO RELATED APPLICATIONS

This application claims priority to U.S. Provisional Patent Application No. 62/253,604, filed Nov 10, 2015, which is incorporated by reference in its entirety.

BACKGROUND

The present disclosure generally relates to controls for virtual reality systems, and specifically relates to a control providing tactile feedback to a user interacting with a virtual reality system.

Virtual reality (VR) systems typically provide multiple types of sensory output to a user, such as audio and video data presented by a VR headset and audio system, respectively. By providing different types of sensory output, a VR system provides the user with an illusion that the user is immersed in a virtual world generated by the VR system. Additionally, a VR system may include an input interface, such as a glove, that detects position, acceleration, orientation, and other information associated with a portion of the user's body (e.g., the user's hand) and provides the information as input to the VR system Based on the input from the input interface based on movement of the user in the real world, the VR system may move a corresponding item in the virtual world (e.g., a hand or other appendage belonging to a character in the virtual world). An input interface also facilitates user interaction with other objects in the virtual world. For example, the VR system allows the user to manipulate virtual objects by touching them, picking them up, and moving them through movement of the input interface. However, conventional VR systems do not provide tactile feedback to users as they interact with virtual objects, which may detract from user interaction with virtual objects presented by the VR system.

SUMMARY

A control for a virtual reality (VR) or system environment includes two opposing portions configured to contact different portions of a user's body. For example, the control is a single band of material, such as metal, bent to form a portion and an additional portion. The bend in the band of material allows ends of the portion and the additional portion in a plane parallel to a plane including the bend to move. The portion of the material and the additional portion of the material contact different portions of the user's body, and as one of the portions of the user's body moves towards the other portion of the user's body, the corresponding portion of the material contacting the moving portion of the user's body also moves towards the other portion of the material contacting the other portion of the user's body. For example, a portion of the material contacts a user's thumb, while an additional portion of the material contacts a user's forefinger. If the user moves the user's forefinger towards the user's thumb, the additional portion of the material moves towards the portion of the material.

Positions of the portions of the control relative to each other may be associated with various commands. For example, information identifying a position of a portion of the control relative to the additional portion of the control is communicated to a component of the VR system environment, which identifies a command corresponding to the identified position. Based on the identified command, one or more components of the VR system environment perform one or more actions corresponding to the identified command. For example, presentation of one or more virtual objects presented by the VR system environment is modified based on the identified command.

In various embodiments, the control includes one or more feedback mechanisms to provide the user with tactile feedback that simulates interactions with one or more virtual objects presented by the VR system environment. For example, the feedback mechanisms provide the user with tactile feedback simulating grabbing an object presented by the VR system environment or performing a pinching motion to grasp or to contact presented by the VR system environment. Various feedback mechanisms may be used in different embodiments. For example, the control includes one or more tendons on the opposing portions that contact portions of a user's body and coupled to a motor that moves the tendon to move portions of the user's body contacting the tendon. As the tendon moves, portions of the user's body contacting the tendon are stretched, providing tactile feedback to the user. Alternatively, the control includes one or more actuators on the opposing portions, with each actuator including a pad having a surface contacting a surface of the user's body. A driving mechanism moves the pad of an actuator in one or more directions parallel to the surface of the user's body based on instructions received from a component in the VR system. In another example, the opposing portions include one or more pins contacting portions of the user's body and also contacting a surface of a bladder, which may be coupled to one or more of the opposing portions or included in one or more of the opposing portions. As the bladder is inflated or deflated, the pins move, causing movement, such as stretching, of the portions of the user's body contacting the pins. In other embodiments, each portion of the control includes one or more magnets preventing movement of the portions relative to each other when actuated. Alternatively, one or more of the portions of the control include any suitable feedback mechanism that jams the movement of the portions of the user's body contacting the portions of the control by increasing rigidity of one or more of the portions.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

System Overview

Figure 1:
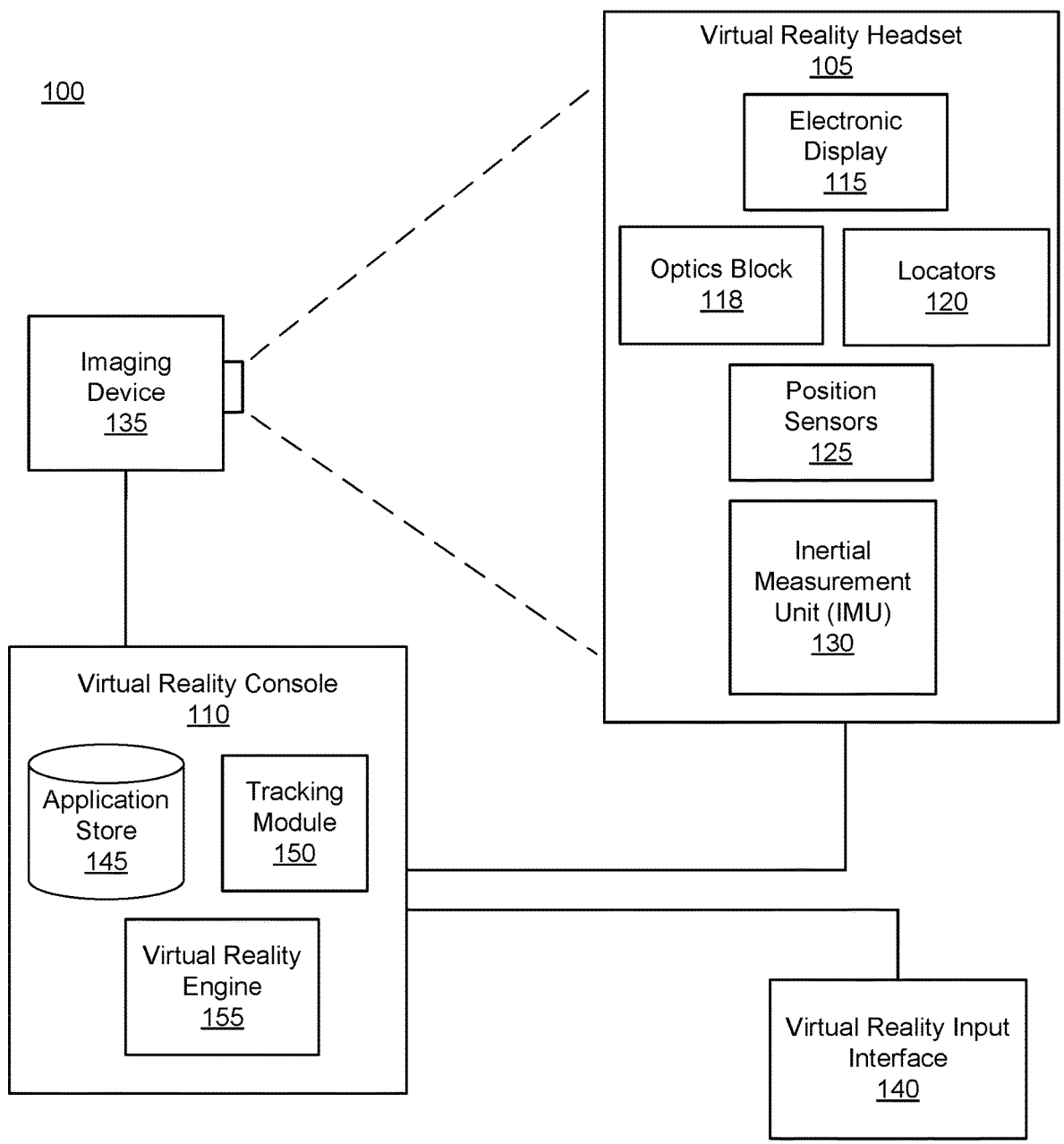
FIG. 1 is a block diagram of a system environment including a virtual reality system environment, in accordance with an embodiment.

FIG. 1 is a block diagram of a virtual reality (VR) system environment 100 in which a VR console 110 operates. The system environment 100 shown by FIG. 1 comprises a VR headset 105, an imaging device 135, and a VR input interface 140 that are each coupled to the VR console 110. While FIG. 1 shows an example system 100 including one VR headset 105, one imaging device 135, and one VR input interface 140, in other embodiments any number of these components may be included in the system 100. For example, there may be multiple VR headsets 105 each having an associated VR input interface 140 and being monitored by one or more imaging devices 135, with each VR headset 105, VR input interface 140, and imaging devices 135 communicating with the VR console 110. In alternative configurations, different and/or additional components may be included in the system environment 100.

The VR headset 105 is a head-mounted display that presents media to a user. Examples of media presented by the VR head set include one or more images, video, audio, or some combination thereof. In some embodiments, audio is presented via an external device (e.g., speakers and/or headphones) that receives audio information from the VR headset 105, the VR console 110, or both, and presents audio data based on the audio information. An embodiment of the VR headset 105 is further described below in conjunction with FIGS. 2A and 2B. The VR headset 105 may comprise one or more rigid bodies, which may be rigidly or non-rigidly coupled to each other together. A rigid coupling between rigid bodies causes the coupled rigid bodies to act as a single rigid entity. In contrast, a non-rigid coupling between rigid bodies allows the rigid bodies to move relative to each other.

The VR headset 105 includes an electronic display 115, a corrective element 116, an optics block 118, one or more locators 120, one or more position sensors 125, and an inertial measurement unit (IMU) 130. The electronic display 115 displays images to the user in accordance with data received from the VR console 110. In various embodiments, the electronic display 115 may comprise a single electronic display or multiple electronic displays (e.g., a display for each eye of a user). Examples of the electronic display 115 include: a liquid crystal display (LCD), an organic light emitting diode (OLED) display, an active-matrix organic light-emitting diode display (AMOLED), some other display, or some combination thereof.

The electronic display 115 includes a display area comprising a plurality of sub-pixels, where a sub-pixel is a discrete light emitting component. Different sub-pixels are separated from each other by dark space. For example, a sub-pixel emits red light, yellow light, blue light, green light, white light, or any other suitable color of light. In some embodiments, images projected by the electronic display 115 are rendered on the sub-pixel level. This is distinct from, say an RGB (red-green-blue) layout, which has discrete red, green, and blue pixels (red, green, and blue) and each pixel in the RGB layout includes a red sub-pixel, which is adjacent to a green sub-pixel that is adjacent to a blue sub-pixel; the red, green, and blue sub-pixels operate together to form different colors. In an RGB layout a sub-pixel in a pixel is restricted to working within that pixel. However, in some embodiments, sub-pixels in the electronic display operate within multiple "logical" pixels in their surrounding vicinity to form different colors. The sub-pixels are arranged on the display area of the electronic display 115 in a sub-pixel array. Examples of a sub-pixel array include PENTILE® RGBG, PENTILE® RGBW, some another suitable arrangement of sub-pixels that renders images at the sub-pixel level. In some embodiments, one or more adjacent sub-pixels are of the same color.

In various embodiments, the display area of the electronic display 115 arranges sub-pixels in a hexagonal layout, in contrast to a rectangular layout used by conventional RGB type systems. Moreover, some users are more comfortable viewing images which appear to have been generated via a rectangular layout of sub-pixels. In embodiments where the sub-pixels are arrayed hexagonally, the corrective element 116 may be configured to generate amounts of blur that causes the array of sub-pixels in the image presented to the user to appear to be arrayed in a rectangular layout.

The optics block 118 magnifies received light, corrects optical errors associated with the image light, and presents the corrected image light is presented to a user of the VR headset 105. An optical element may be an aperture, a Fresnel lens, a convex lens, a concave lens, a filter, or any other suitable optical element that affects the blurred image light. Moreover, the optics block 118 may include combinations of different optical elements. In some embodiments, one or more of the optical elements in the optics block 118 may have one or more coatings, such as anti-reflective coatings.

Magnification of the image light by the optics block 118 allows the electronic display 115 to be physically smaller, weigh less, and consume less power than larger displays. Additionally, magnification may increase a field of view of the displayed media For example, the field of view of the displayed media is such that the displayed media is presented using almost all (e.g., 110 degrees diagonal), and in some cases all, of the user's field of view. Additionally, the optics block 118 may be designed so its effective focal length is larger than the spacing to the electronic display 115, which magnifies the image light projected by the electronic display 115. Additionally, in some embodiments, the amount of magnification may be adjusted by adding or removing optical elements.

The optics block 118 may be designed to correct one or more types of optical error. Examples of optical error include: two dimensional optical errors, three dimensional optical errors, or some combination thereof. Two dimensional errors are optical aberrations that occur in two dimensions. Example types of two dimensional errors include: barrel distortion, pincushion distortion, longitudinal chromatic aberration, transverse chromatic aberration, or any other type of two-dimensional optical error. Three dimensional errors are optical errors that occur in three dimensions. Example types of three dimensional errors include spherical aberration, comatic aberration, field curvature, astigmatism, or any other type of three-dimensional optical error. In some embodiments, content provided to the electronic display 115 for display is pre-distorted, and the optics block 118 corrects the distortion when is receives image light from the electronic display 115 generated based on the content.

The locators 120 are objects located in specific positions on the VR headset 105 relative to one another and relative to a specific reference point on the VR headset 105. A locator 120 may be a light emitting diode (LED), a corner cube reflector, a reflective marker, a type of light source that contrasts with an environment in which the VR headset 105 operates, or some combination thereof. In embodiments where the locators 120 are active (i.e., an LED or other type of light emitting device), the locators 120 may emit light in the visible band (~380 nm to 750 nm), in the infrared (IR) band (~750 nm to 1 mm), in the ultraviolet band (10 nm to 380 nm), some other portion of the electromagnetic spectrum, or some combination thereof.

In some embodiments, the locators 120 are located beneath an outer surface of the VR headset 105, which is transparent to the wavelengths of light emitted or reflected by the locators 120 or is thin enough to not substantially attenuate the wavelengths of light emitted or reflected by the locators 120. Additionally, in some embodiments, the outer surface or other portions of the VR headset 105 are opaque in the visible band of wavelengths of light. Thus, the locators 120 may emit light in the IR band under an outer surface that is transparent in the IR band but opaque in the visible band.

The IMU 130 is an electronic device that generates fast calibration data based on measurement signals received from one or more of the position sensors 125. A position sensor 125 generates one or more measurement signals in response to motion of the VR headset 105. Examples of position sensors 125 include: one or more accelerometers, one or more gyroscopes, one or more magnetometers, another suitable type of sensor that detects motion, a type of sensor used for error correction of the IMU 130, or some combination thereof. The position sensors 125 may be located external to the IMU 130, internal to the IMU 130, or some combination thereof.

Based on the one or more measurement signals from one or more position sensors 125, the IMU 130 generates fast calibration data indicating an estimated position of the VR headset 105 relative to an initial position of the VR headset 105. For example, the position sensors 125 include multiple accelerometers to measure translational motion (forward/back, up/down, left/right) and multiple gyroscopes to measure rotational motion (e.g., pitch, yaw, roll). In some embodiments, the IMU 130 rapidly samples the measurement signals and calculates the estimated position of the VR headset 105 from the sampled data For example, the IMU 130 integrates the measurement signals received from the accelerometers over time to estimate a velocity vector and integrates the velocity vector over time to determine an estimated position of a reference point on the VR headset 105. Alternatively, the IMU 130 provides the sampled measurement signals to the VR console 110, which determines the fast calibration data. The reference point is a point that may be used to describe the position of the VR headset 105. While the reference point may generally be defined as a point in space; however, in practice the reference point is defined as a point within the VR headset 105 (e.g., a center of the IMU 130).

The IMU 130 receives one or more calibration parameters from the VR console 110. As further discussed below, the one or more calibration parameters are used to maintain tracking of the VR headset 105. Based on a received calibration parameter, the IMU 130 may adjust one or more IMU parameters (e.g., sample rate) In some embodiments, certain calibration parameters cause the IMU 130 to update an initial position of the reference point so it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

The imaging device 135 generates slow calibration data in accordance with calibration parameters received from the VR console 110. Slow calibration data includes one or more images showing observed positions of the locators 120 that are detectable by the imaging device 135. The imaging device 135 may include one or more cameras, one or more video cameras, any other device capable of capturing images including one or more of the locators 120, or some combination thereof. Additionally, the imaging device 135 may include one or more filters (e.g., used to increase signal to noise ratio). The imaging device 135 is configured to detect light emitted or reflected from locators 120 in a field of view of the imaging device 135. In embodiments where the locators 120 include passive elements (e.g., a retroreflector), the imaging device 135 may include a light source that illuminates some or all of the locators 120, which retro-reflect the light towards the light source in the imaging device 135. Slow calibration data is communicated from the imaging device 135 to the VR console 110, and the imaging device 135 receives one or more calibration parameters from the VR console 110 to adjust one or more imaging parameters (e.g., focal length, focus, frame rate, ISO, sensor temperature, shutter speed, aperture, etc.).

The VR input interface 140 is a device that allows a user to send action requests to the VR console 110. An action request is a request to perform a particular action. For example, an action request may be to start or end an application or to perform a particular action within the application. The VR input interface 140 may include one or more input devices. Example input devices include: a keyboard, a mouse, a game controller, or any other suitable device for receiving action requests and communicating the received action requests to the VR console 110. An action request received by the VR input interface 140 is communicated to the VR console 110, which performs an action corresponding to the action request. In some embodiments, the VR input interface 140 may provide haptic feedback to the user in accordance with instructions received from the VR console 110. For example, haptic feedback is provided when an action request is received, or the VR console 110 communicates instructions to the VR input interface 140 causing the VR input interface 140 to generate haptic feedback when the VR console 110 performs an action. In various embodiments, the VR input interface 140 includes one or more controls, an example of which is further described below in conjunction with FIG. 2, contacting areas of a user's body and receiving action requests based on movement of one or more areas of the user's body. For example, the VR input interface 140 includes a glove that identifies action requests based on movements of the user's hand and communicates the action request to the VR console 110. A control included in the VR input interface 140 may also provide haptic or other tactile feedback when the VR console 110 performs an action or receives an action request. For example, a control includes one or more actuators that apply pressure, tension, or vibration to an area of the user's body contacting a portion of the control including the actuator. Hence, haptic or tactile feedback produced by the VR input interface 140 allows a user to simulate physical interaction with content presented by the VR headset 105.

The VR console 110 provides media to the VR headset 105 for presentation to the user in accordance with information received from one or more of: the imaging device 135, the VR headset 105, and the VR input interface 140. In the example shown in FIG. 1, the VR console 110 includes an application store 145, a tracking module 150, and a virtual reality (VR) engine 155. Some embodiments of the VR console 110 have different modules than those described in conjunction with FIG. 1. Similarly, the functions further described below may be distributed among components of the VR console 110 in a different manner than is described here.

The application store 145 stores one or more applications for execution by the VR console 110. An application is a group of instructions, that when executed by a processor, generates content for presentation to the user. Content generated by an application may be in response to inputs received from the user via movement of the HR headset 105 or the VR interface device 140. Examples of applications include: gaming applications, conferencing applications, video playback application, or other suitable applications.

The tracking module 150 calibrates the VR system 100 using one or more calibration parameters and may adjust one or more calibration parameters to reduce error in determination of the position of the VR headset 105. For example, the tracking module 150 adjusts the focus of the imaging device 135 to obtain a more accurate position for observed locators on the VR headset 105. Moreover, calibration performed by the tracking module 150 also accounts for information received from the IMU 130. Additionally, if tracking of the VR headset 105 is lost (e.g., the imaging device 135 loses line of sight of at least a threshold number of the locators 120), the tracking module 140 re-calibrates some or all of the system environment 100.

The tracking module 150 tracks movements of the VR headset 105 using slow calibration information from the imaging device 135. The tracking module 150 determines positions of a reference point of the VR headset 105 using observed locators from the slow calibration information and a model of the VR headset 105. The tracking module 150 also determines positions of a reference point of the VR headset 105 using position information from the fast calibration information. Additionally, in some embodiments, the tracking module 150 may use portions of the fast calibration information, the slow calibration information, or some combination thereof, to predict a future location of the headset 105. The tracking module 150 provides the estimated or predicted future position of the VR headset 105 to the VR engine 155.

The VR engine 155 executes applications within the system environment 100 and receives position information, acceleration information, velocity information, predicted future positions, or some combination thereof of the VR headset 105 from the tracking module 150. Based on the received information, the VR engine 155 determines content to provide to the VR headset 105 for presentation to the user. For example, if the received information indicates that the user has looked to the left, the VR engine 155 generates content for the VR headset 105 that mirrors the user's movement in a virtual environment. Additionally, the VR engine 155 performs an action within an application executing on the VR console 110 in response to an action request received from the VR input interface 140 and provides feedback to the user that the action was performed. The provided feedback may be visual or audible feedback via the VR headset 105 or haptic feedback via the VR input interface 140.

Figure 2:
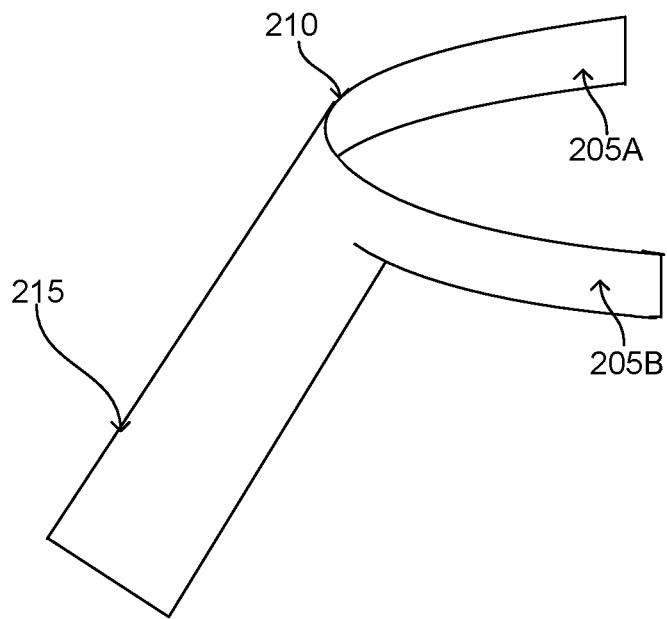
FIG. 2 is a diagram of a control for a virtual reality system environment providing tactile feedback to a user interacting with a virtual environment presented by the virtual reality system environment, in accordance with an embodiment.

FIG. 2 is a diagram of a control 200 included in a VR input interface 140 of a VR system environment 100. The control 200 includes two opposing portions 205A, 205B configured to contact different portions of a user's body. For example, the control 200 is a single band 210 of material, such as metal or plastic, bent to form a portion 205A and an additional portion 205A. The bend in the band 210 of material allows ends of the portion 205A and the additional portion 205B in a plane parallel to a plane including the bend to move. The portion of the material 205A and the additional portion 205B of the band 210 material contact different portions of the user's body. As a portion of the user's body contacting the portion 205A moves towards another portion of the user's body contacting the additional portion 205B, the portion 205A moves towards the additional portion 205B. For example, the portion 205A contacts a user's thumb, while the additional portion 205B of the material contacts a user's forefinger. If the user moves the user's forefinger towards the user's thumb, the additional portion 205B moves towards the portion 205A. In the example of FIG. 2, the control 200 includes a handle 215, allowing a user to more easily grasp or interact with the control 200. However, in other embodiments, the control 200 does not include the handle 215.

While FIG. 2 shows an embodiment of the control 200 where the portion 205A and the additional portion 205B are different sections of a band 210 of material, in other embodiments, the control 200 may have different constructions. For example, the portion 205A and the additional portion 205B are discrete components coupled to each other via a pivot or joint coupled to a section of the portion 205A and to a section of the additional portion 205B. In one embodiment, a pivot or a joint couples an end of the portion 205A proximate to a handle 215 or proximate to a portion of the user's body to an end of the additional portion 205B proximate to the handle 215 or proximate to the portion of the user's body. The pivot or joint allows the portion 205A and the additional portion 205B to move relative to each other, as described above.

Positions of the portion 205A and of the additional portion 205B relative to each other may be associated with various commands. For example, information identifying a position of the portion 205A relative to the additional portion 205B of the control is communicated to a component of the VR system environment 100, such as the VR console 110, which identifies a command corresponding to the identified position. Based on the identified command, one or more components of the VR system environment 100 perform one or more actions corresponding to the identified command. For example, the VR console 110 modifies presentation of one or more virtual objects by the VR headset 105 based on the identified command.

In various embodiments, the control 200 includes one or more feedback mechanisms to provide the user with tactile feedback simulating interactions with one or more virtual objects presented by the VR headset 105. For example, the one or more feedback mechanisms provide the user with tactile feedback when a user grabs or performs a pinching mechanism with a virtual object presented by the VR headset 105. Various feedback mechanisms may be used in different embodiments. For example, the control 200 includes one or more tendons on the portion 205A and on the additional portion 205B that contact portions of a user's body. Each tendon is coupled to a motor that moves a tendon, causing a portion of the user's body contacting the tendon to stretch, providing tactile feedback to the user. Alternatively, the control 200 includes one or more actuators on the portion 205A and on the additional portion 205B, with each actuator including a pad having a surface contacting a surface of the user's body. A driving mechanism moves the pad of an actuator in one or more directions parallel to the surface of the user's body based on instructions received from a component in the VR system environment 100, such as the VR console 110. For example, if the VR system environment 100 communicates instructions to the control 200 indicating the user is grabbing an object presented by the VR headset 105, the control 200 receives an instruction that moves a pad of an actuator in a direction parallel to a surface of the user's body, providing the user with tactile feedback simulating physically grabbing the object. In another example, the portion 205A and the additional portion 205B include one or more pins contacting portions of the user's body and also contacting a surface of a bladder, which may be coupled to one or more of the portion 205A and the additional portion 205B or included in one or more of the portion 205A and the additional portion 205B As the bladder is inflated or deflated, the pins move, causing movement, such as stretching, of the portions of the user's body contacting the pins. In other embodiments, the portion 205A and the additional portion 205B include one or more magnets preventing movement of the portion 205A and the additional portion 205B relative to each other when actuated. The magnets may be electromagnets or programmable magnets configured to be activated in response to one or more instructions received from the VR console 110. For example, the control 200 receives instructions from the VR console 110 indicating the user is pinching an object presented via the VR headset 105 and actuates magnets to prevent movement of the portion 205A relative to the other portion 205B to simulate the pinching movement. Alternatively, the portion 205A and the additional portion 205B include any suitable feedback mechanism configured to jam movement of the portions of the user's body contacting the portion 205A and the additional portion 205B when activated by increasing rigidity of the portion 205A or of the additional portion 205B. For example, the portion 205A or the additional portion 205B include a tendon that encloses fluid, when an amount of fluid included in the tendon equals or exceeds a threshold amount, movement of the portion 205A or of the additional portion 205B is restricted.

SUMMARY

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

The language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosed embodiments are intended to be illustrative, but not limiting, of the scope of the disclosure, which is set forth in the following claims.

What is claimed is:

1. A system comprising:
    a control including:
        a single band of material bent to form:
            a portion configured to contact a portion of a body of a user and having an end capable of moving, and
            an additional portion opposing the portion and configured to contact a different portion of the body of the user and having an additional end configured to move, the additional portion configured to move towards the portion in response to the portion moving towards the additional portion, the additional end and the end in a plane parallel to a plane including the bend;
    a console coupled to the control, the console configured to receive information identifying a position of the portion of the control relative to the additional portion of the control from the control, to identify a command corresponding to the identified position, and to perform one or more actions associated with the identified command; and
    a feedback mechanism configured to provide tactile feedback to the body of the user responsive to a movement of the portion of the band in a direction towards the additional portion, the feedback mechanism configured to restrict the movement of the portion of the band in the direction towards the additional portion of the band.

2. The system of claim 1, wherein the feedback mechanism further comprises:
    an other tendon coupled to the portion and to the additional portion, the other tendon and configured to contact the portion of the body of the user and the different portion of the body of the user; and
    a motor coupled to the other tendon and configured to move the other tendon to stretch the portion of the body of the user and the different portion of the body of the user.

3. The system of claim 1, wherein a feedback mechanism comprises:
    an actuator coupled to the portion, the actuator including a pad having a surface contacting the portion of the body of the user; and
    a driving mechanism coupled to the pad of the actuator and configured to move the portion of the body of the user contacting the surface of the pad in a direction parallel to the surface body based on instructions received from the console.

4. The system of claim 1, wherein a feedback mechanism comprises:
    one or more pins included on the portion and configured to contact at least some of the portion of the body of the user; and
    a bladder having a surface contacting the one or more pins, the bladder configured to be inflated with a fluid, causing repositioning of the one or more pins.

5. The system of claim 1, wherein a feedback mechanism comprises:
    one or more magnets included on the portion of the control; and
    one or more additional magnets included on the additional portion of the control and oriented so magnetic fields from the one or more magnets and from the one or more magnets prevent movement of the portion and the additional portion relative to each other.

6. The system of claim 5, wherein the one or more magnets are configured to generate a magnetic field in response to one or more instructions received from the console.

7. The system of claim 6, wherein the one or more additional magnets are configured to generate a magnetic field in response to one or more instructions received from the console.

8. The system of claim 1, wherein a jamming mechanism comprises: a tendon included in the portion and enclosing fluid, an amount of fluid enclosed by the tendon modified based on one or more instructions received from the console.

9. The system of claim 1, wherein an action associated with the identified command comprises modifying presentation of one or more virtual objects generated by the console for presentation to the user.

10. The system of claim 1, wherein the single band of material is made from metal.

11. The system of claim 1, wherein the single band of material is made from plastic.

12. An apparatus comprising:
a single band having a bend causing the single band to include:
  a portion configured to contact a portion of a body of a user and having an end capable of moving, and
  an additional portion configured to contact a different portion of the body of the user and having an additional end configured to move, the additional portion opposing the portion of the single band and configured to move towards the portion in response to the portion moving towards the additional portion, wherein information identifying a position of the portion of the control relative to the additional portion is transmitted to a console configured to perform one or more actions based on the identified position, the additional end and the end in a plane parallel to a plane including the bend; and
a feedback mechanism configured to provide tactile feedback to the body of the user responsive to a movement of the portion of the band in a direction towards the additional portion, the feedback mechanism configured to restrict the movement of the portion of the band in the direction moving towards the additional portion of the band.

13. The apparatus of claim 12, wherein the feedback mechanism further comprises:
  an other tendon coupled to the portion and to the additional portion, the other tendon and configured to contact the portion of the body of the user and the different portion of the body of the user;
  a motor coupled to the other tendon and configured to move the other tendon to stretch the portion of the body of the user and the different portion of the body of the user.

14. The apparatus of claim 12, wherein a feedback mechanism comprises:
  an actuator coupled to the portion, the actuator including a pad having a surface contacting the portion of the body of the user; and
  a driving mechanism coupled to the pad of the actuator and configured to move the portion of the body of the user contacting the surface of the pad in a direction parallel to the surface body based on instructions received from the console.

15. The apparatus of claim 12, wherein a feedback mechanism comprises:
  one or more pins included on the portion and configured to contact at least some of the portion of the body of the user; and
  a bladder having a surface contacting the one or more pins, the bladder configured to be inflated with a fluid, causing repositioning of the one or more pins.

16. The apparatus of claim 12, wherein a feedback mechanism comprises:
  one or more magnets included on the portion; and
  one or more additional magnets included on the additional portion and oriented so magnetic fields from the one or more magnets and from the one or more magnets prevent movement of the portion and the additional portion relative to each other.

17. The apparatus of claim 16, wherein the one or more magnets are configured to generate a magnetic field in response to one or more instructions received from the console.

18. The apparatus of claim 17, wherein the one or more additional magnets are configured to generate a magnetic field in response to one or more instructions received from the console.

19. The apparatus of claim 12, wherein a jamming mechanism comprises: a tendon included in the portion and enclosing fluid, an amount of fluid enclosed by the tendon modified based on one or more instructions received from the console.

20. The apparatus of claim 12, wherein the single band of material is made from metal.

21. The apparatus of claim 12, wherein the single band of material is made from plastic.

* * * * *